Aug. 23, 1966  T. C. PAYNE  3,267,924
FOOD BROILING APPARATUS
Filed May 25, 1964  4 Sheets-Sheet 1

INVENTOR.
THOMAS C. PAYNE
BY
Horton, Davis, Brewer & Brugman
Attys.

Aug. 23, 1966

T. C. PAYNE 3,267,924

FOOD BROILING APPARATUS

Filed May 25, 1964

INVENTOR.
THOMAS C. PAYNE
BY
Horton, Davis, Brewer & Brugman
Attys.

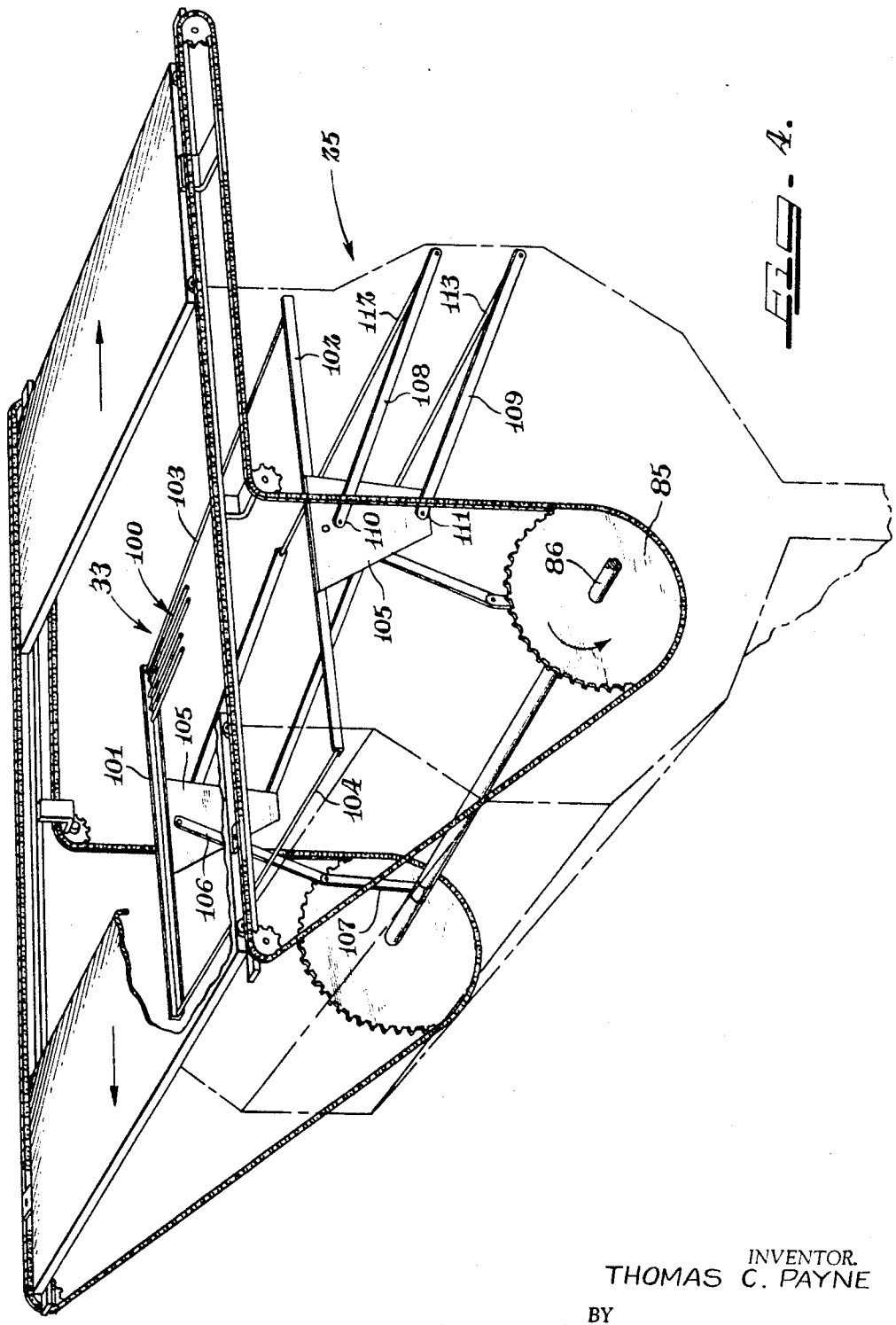

Aug. 23, 1966    T. C. PAYNE    3,267,924
FOOD BROILING APPARATUS
Filed May 25, 1964    4 Sheets-Sheet 4

INVENTOR.
THOMAS C. PAYNE
BY
Horton, Davis, Brewer & Brugman
Attys.

United States Patent Office 3,267,924
Patented August 23, 1966

3,267,924
FOOD BROILING APPARATUS
Thomas C. Payne, Rte. 1, Rockton, Ill.
Filed May 25, 1964, Ser. No. 369,775
2 Claims. (Cl. 126—41)

This invention relates to apparatus for broiling food, especially meat, and more particularly to improvements in food broiling apparatus utilizing infrared heat energy.

Devices for processing foods by broiling or cooking with radiant energy are well known in the art, and among such prior known devices one of the more commercially successful types utilizes gas burners having ceramic mats which convert the gas flame to high intensity infrared rays which rapidly broil the food. In addition to the infrared energy, it is also essential in this class of broiler to control the atmosphere of the food broiling chamber so as to maintain the oxygen content thereof at a level insufficient to support combustion of the food while insuring substantially complete combustion of the gaseous fuel. The present invention relates generally to this type of infrared food broiling apparatus, and is especially directed to improved means for supporting the food, such as meat, during the broiling process, as well as to an improved arrangement of the infrared burners whereby the food is subjected to a more uniform distribution of infrared energy. As a consequence of these improvements, foods having a relatively high liquid content, such as meat, are cooked with a more even and uniform distribution and retention of internal juices.

Typifying the class of devices to which the present invention especially pertains is the broiler of U.S. Patent No. 2,997,941 issued on August 29, 1961. The apparatus of that patent, while utilizing an enclosed broiling compartment and infrared heat source of the type contemplated by the present invention, also requires that meat or other foods to be broiled be suspended in a vertically disposed rack located between a pair of opposed infrared burners. Although the apparatus of that patent has generally met with favorable commercial acceptance, the provision of the vertical food supporting rack and the burner arrangement, as well as the means for enclosing the broiler compartment, have given rise to certain difficulties and undesirable results which the present invention successfully overcomes.

Specifically, by supporting the food between a pair of vertical spaced racks the operator is immediately limited to the thickness of food which may be inserted between the racks. Also the vertical positioning of the food, such as meat, causes the internal juices thereof to gravitate downwardly and collect near the lower end thereof to create an internal static pressure head which substantially increases the tendency of the juices to escape or drip from the food. This activity undesirably results in drying out the upper end or portions of the food. By suspending the meat or food between a pair of opposed infrared burners, the cooking energy supplied thereto generally confronts only those faces of the food directly opposite the burners, leaving the ends or edges thereof relatively unexposed to the infrared rays. Thus while the broad faces of the meat are immediately seared and sealed over by the heat rays, the edges thereof are not, so that the internal juices tend to escape more easily through the unseared edges of the meat.

It is to be noted also that in the apparatus described in said Patent No. 2,997,941, the means for enclosing the upper end of the broiling compartment includes a pair of sliding doors and upper portions of the vertical food supporting rack means which in fact project or extend through and between said sliding doors. Thus the broiling compartment of that patent has several seams or openings at its upper end through which the pressurized atmosphere and heat within the broiling compartment readily may escape.

In brief, the present invention avoids the above-outlined difficulties and problems as specifically exhibited by the broiling apparatus of the aforesaid Patent No. 2,997,941. Essentially this invention provides improved means for supporting the meat or other food to be broiled in a substantially horizontal attitude and combines therewith a plurality of infrared heat sources or burners located laterally outwardly of and in planes above and below the food to be broiled. Such burners are also mounted so as to direct their infrared output or rays angularly toward the plane of the food supporting means. With such an arrangement the infrared energy is applied substantially uniformly to opposite sides of the food, as well as the edges thereof. Coupled with the improved food supporting means of this invention is an improved means for sealing and enclosing the generally open upper or access end of the broiling compartment thereby to substantially prevent escape of exhaust gases and heat. The latter improved means preferably comprises a pair of automatically operated sliding doors or closure members which abut with a single junction when closed. Provision is also made for interlinking the broiling compartment closure means or sliding doors and the means for raising, lowering and supporting the food. This interlinking arrangement is such that raising of the food supporting means toward the upper end of the broiling compartment to make the same easily accessible to the operator, is accompanied by an automatic opening movement of the closure doors. Conversely, lowering of the food supporting means into a food broiling position is accompanied by automatic closing movement of such doors to seal over the access opening of the broiling compartment. Advantageously, this permits the operator to readily view the food on the food supporting means without removing the same from the heated broiling compartment.

The main object of this invention is to provide an improved food broiling apparatus.

Another important object of this invention is to provide improved means for supporting and applying heat energy to food in a controlled atmosphere broiling device.

Another important object of this invention is to provide improvements in infrared food broiling devices whereby a more uniform application of infrared energy over the food surface is achieved thereby to promote retention of the natural juices in the food during the broiling process.

Still another important object of this invention is to provide a new and improved broiling compartment and food support means for infrared food broiling devices.

Still another object of this invention is to provide a new and improved food supporting means for infrared food broiling devices which is particularly adapted for the broiling of meat, such as a steak and the like, without particular limitation as to the thickness or size of the steak, except as imposed by the overall boundary dimensions of the food supporting means.

Another important object of this invention is to provide a new and improved food broiling apparatus having improved horizontal food supporting means within a controlled atmosphere broiling compartment which is especially adapted for the broiling of meat and similar foods, without limitation as to food thickness whereby one or more food items of different thickness may be simultaneously cooked during a given broiling cycle.

The above and further objects, features and advantages of this invention will appear to those skilled in the art from the following detailed description of a preferred embodiment thereof, as illustrated in the accompanying drawings.

Figure 5:
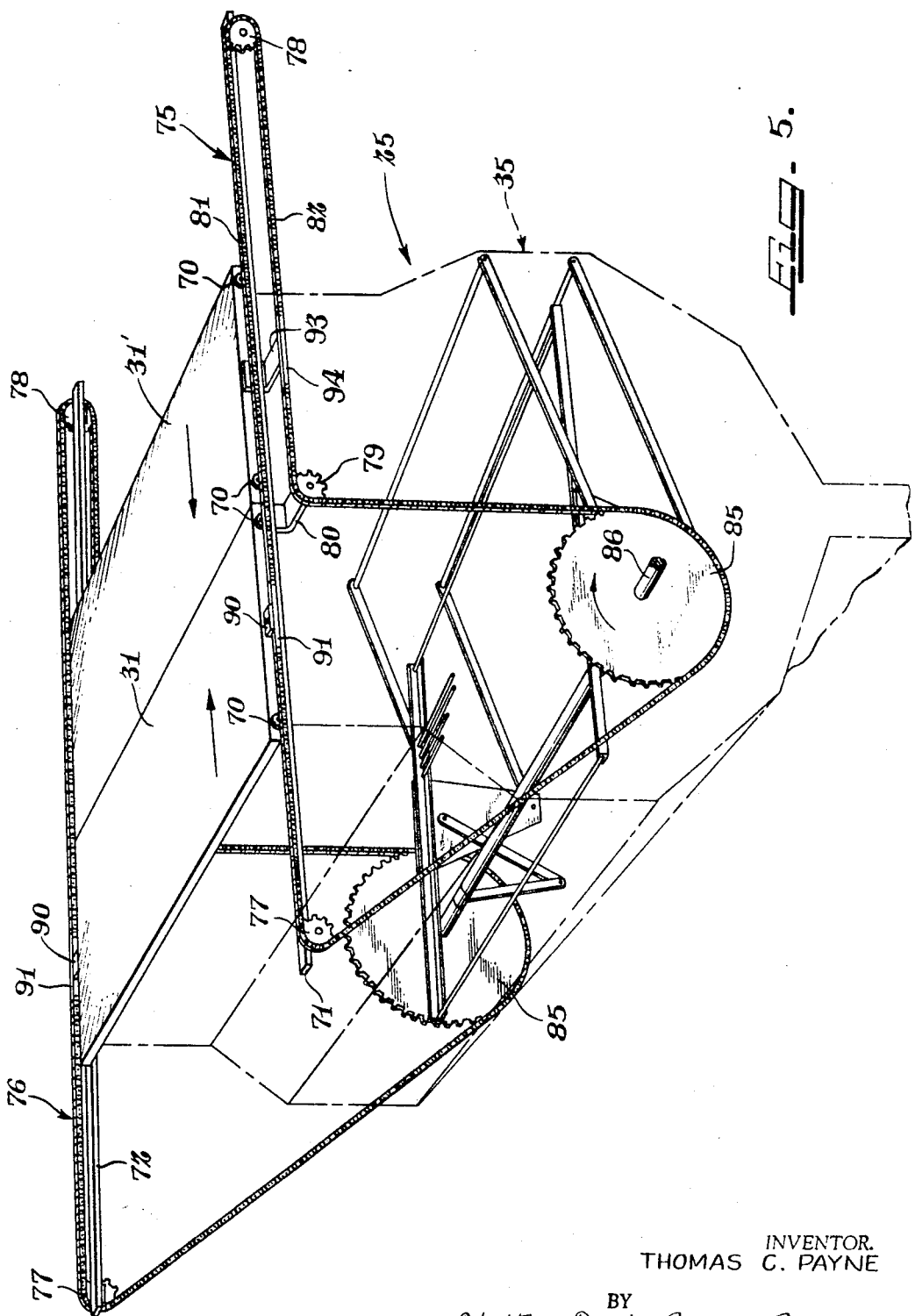

FIGURE 4 is an enlarged perspective view of the improved broiler compartment and food supporting means according to this invention, illustrating the food supporting means in its food loading and unloading position wherein the same is located in the upper regions of the broiling compartment and the closure doors for the latter are opened; and FIGURE 5 is another perspective view, similar to FIGURE 4, showing the food supporting means lowered to a food broiling position and the broiler compartment doors are closed.

Having thus described the present invention, the best mode presently contemplated for carrying out its teachings and for enabling those skilled in the art to make and use the same shall now be set forth in conjunction with the following description of a preferred embodiment of its several features as illustrated in the accompanying drawings.

Figure 1:
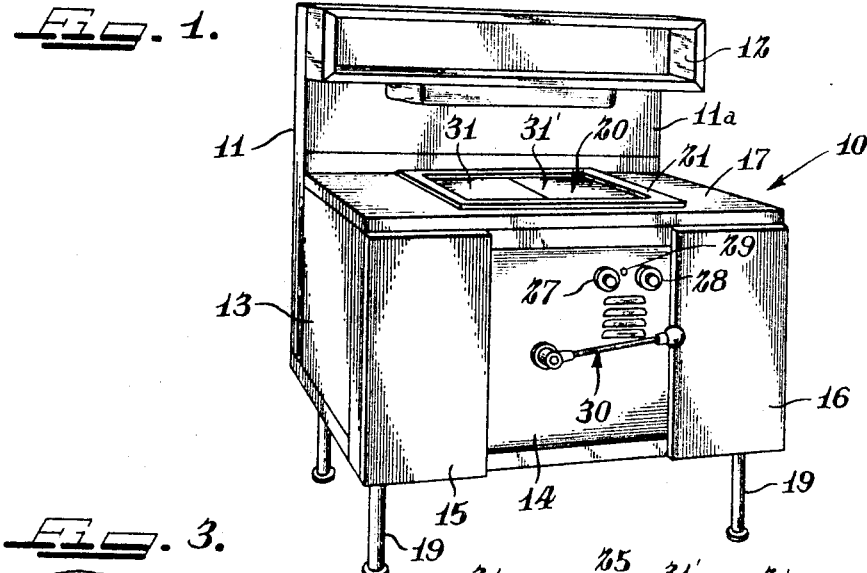
FIGURE 1 is a perspective view of an improved broiling device embodying the present invention.

As seen particularly in FIGURE 1, a broiling device embodying this invention comprises an outer protective housing or cabinet, indicated generally at 10, constructed of stainless steel or like material. The cabinet includes a generally upright back portion 11 near the upper frontal portion of which is advantageously located a plate warming compartment 12. The remainder of the cabinet comprises a generally rectangular housing composed of a pair of parallel spaced end walls, 13, 13 (see FIG. 3) a front wall or control panel 14 which is flanked by front opening doors 15 and 16, and top and bottom walls 17 and 18, respectively (see FIGURE 2). The back and several walls and portions of the housing as above designated, are suitably supported by and on an internal metal supporting framework, preferably fabricated from angle iron or similar structural brace elements, rigidly interjoined. Ground-engaging legs 19, 19 are located conveniently at the lower four corners of the cabinet to support the same. The upper wall 17 of the cabinet is particularly distinguished by an enlarged central access opening 20, herein shown rectangular shaped, which is bordered by a raised frame portion 21. Mounted directly beneath the opening 20 and behind the front panel 14 is the improved broiling apparatus of this invention, which is indicated generally by numeral 25, as best shown in FIGURES 2 and 3.

Conventional known electrical control means 26 (see FIGURE 2) are mounted behind panel 14, while control knobs, constituting a pair of manually movable timer pointers 27 and 28, and an indicator lamp 29, are provided on the front side of panel 14. Also accessible forwardly of the front panel 14 is a manually operable control lever 30 which serves to operatively control movement of a pair of access doors 31, 31 across the upper end of the broiling compartment 32 and to position the horizontal food supporting means 33 within such compartment.

Figure 3:
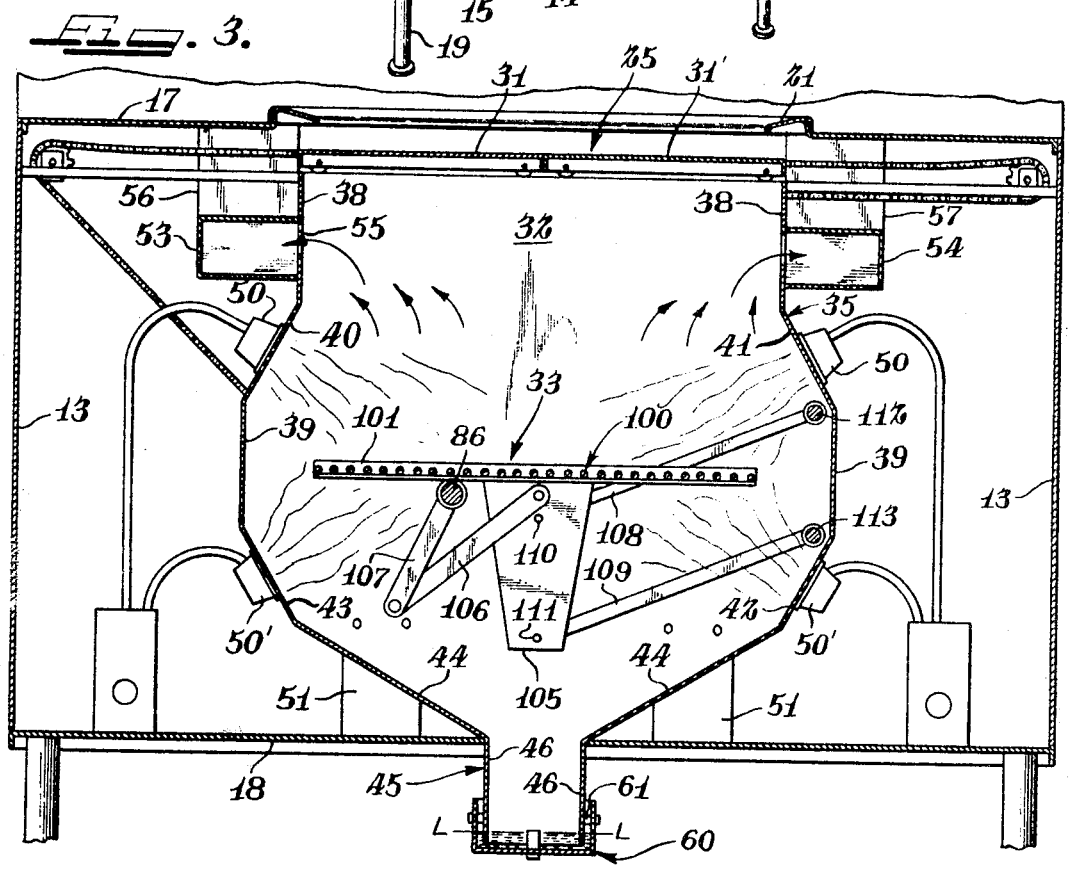
FIGURE 3 is a partial cross-sectional view taken substantially along the vantage line 3—3 of FIGURE 2 and looking in the direction of the arrows thereon.
Figure 2:
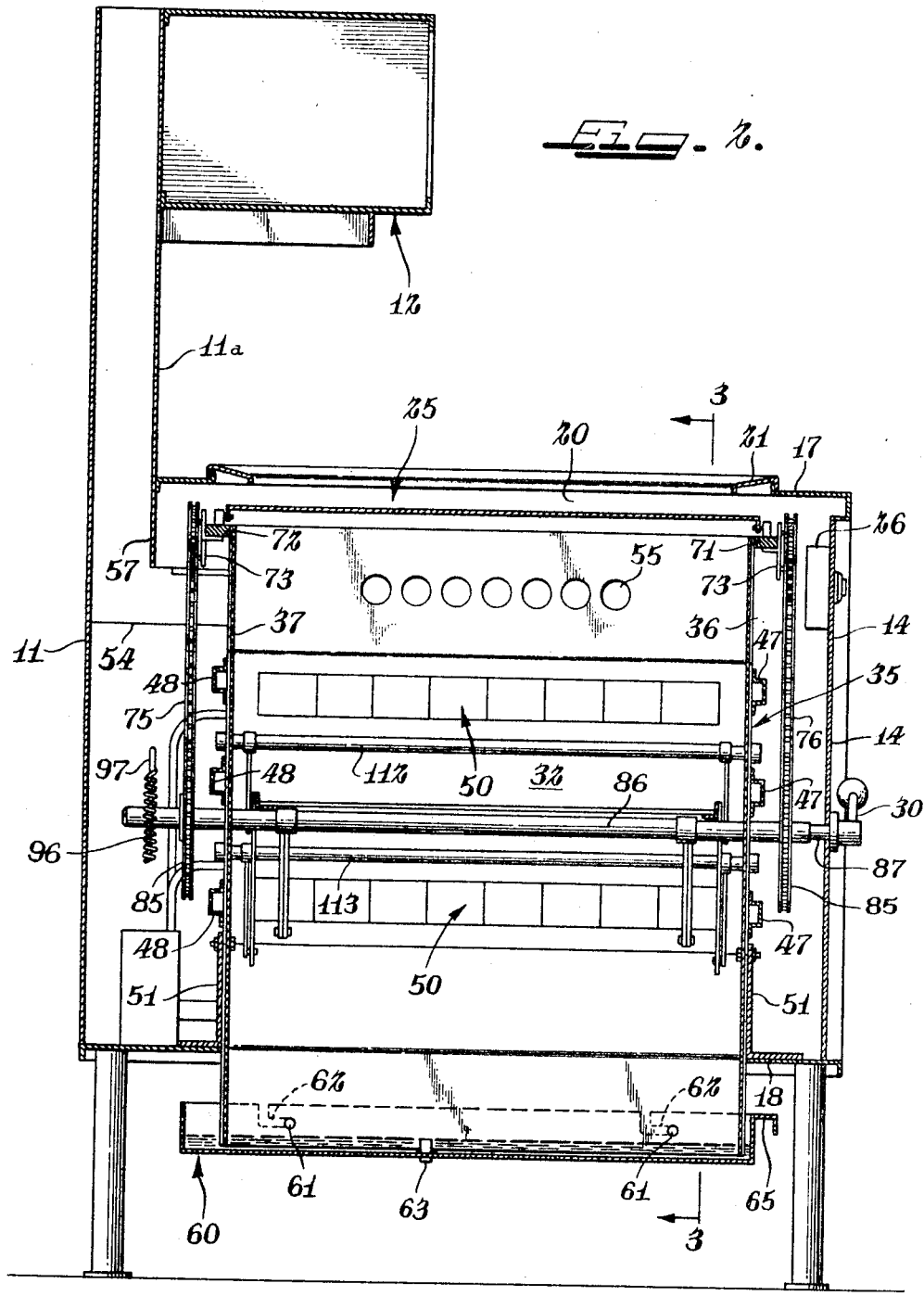
FIGURE 2 is full cross-sectional view of the device illustrated in FIGURE 1 taken on a central plane passing substantially transversely therethrough.

The improved broiling apparatus 25, as shown best in FIGURES 2 and 3, comprises a broiler chamber, indicated generally by numeral 35, which is defined by a heat-resistant metal box having a planar front wall 36, a corresponding rear wall 37, upper parallel spaced side wall portions 38, 38, intermediate side wall portions 39, 39 paralleling the upper side wall portions 38, 38 and angularly disposed burner supporting wall portion 40, 41, 42 and 43. As best shown in FIGURE 3, the burner supporting wall portions 40 and 42 lie on diagonally opposite sides of the broiler chamber 35 in parallel opposed relationship, while the same holds true as to the diagonally opposing wall portions 41, 43. It will be recognized that the several burner supporting wall portions 40–43 are disposed in angularly intersecting relationship with the intermediate side wall portions 39, 39. The upper burner supporting wall portions 40 and 41 further extend between wall portions 38 and 39, while the lower burner supporting wall portions 42 and 43 extend between the intermediate wall portions 39 and angularly disposed bottom wall portions 44, 44 located in opposing relation at the lower end of the broiling chamber. A substantially rectangular cross-sectioned trough portion 45 runs lengthwise of the broiler chamber joining the lowermost regions of the intersectingly related bottom wall portions 44, such trough portion being defined by parallel spaced, vertically disposed wall portions 46, 46 which parallel the side wall portions 38 and 39 of the chamber structure.

As best illustrated in FIGURE 2, the cross-sectional configuration of the broiler chamber is polygonal and, more specifically, bears a substantially hexagonal mid-configuration which merges at its lower end into the sloping bottom walls 44, 44 and at its upper end with an open throat portion defined by the vertically disposed upper side wall portions 38, 38. The two end walls 36 and 37 are rigidly affixed to the several side walls of the broiler chamber, as by welding, to fabricate a rigid structure. Reinforcing channels 47 and 48 are spot welded to the outside of the front and rear walls 36 and 37, respectively, to strengthen the structure and prevent the walls from warping in the presence of the intense heat attending operation of the broiler. Rigidification of the side walls for the broiler compartment is afforded by four conventional infrared gas burner assemblies 50, 50' which extend substantially along the entire length of the angularly disposed burner wall portions 41–43 on which they are mounted. The entire broiler compartment is supported within the cabinet or outer protective housing by means of four mounting cleats 51, 51; two of which are bolted to the front wall 36 of the broiler chamber and two to the rear wall 37 thereon. Cleats 51 also are affixed at their lower ends to the bottom wall 18 of the cabinet as by welding.

Exhaust ducts 53 and 54 are mounted to the outside of the upper side wall portions 38, 38 so as to communicate with a plurality of exhaust openings 55 formed through such walls. The exhaust ducts 53 and 54 extend along the length of the upper side wall portions 38, 38 to rigidify the latter. Ducts 53 and 54 also project rearwardly of the broiler chamber 35 and interconnect with vertical riser ducts 56 and 57 respectively (see FIGURE 3). The vertical riser ducts 56 and 57, as shown in FIG. 2, extend upwardly and are defined between the back wall 11 for the cabinet and a frontal splash panel 11a which parallels wall 11. It will be noted in this regard that the riser ducts 56 and 57 pass behind the plate warming compartment 12 and thereby serve to heat the interior of the latter.

Means for catching and trapping liquids and fats which drip from the food during the broiling process are provided at the lowermost end of the broiling chamber. This means constitutes an elongated open-top drip pan, designated 60, which is removably suspended beneath trough portion 45 at the lower end of the broiling compartment. Specifically, mounting pins 61 project outwardly of the trough portion walls 46, 46 and are received in bayonet slot openings 62, 62 formed in the side walls of the pan 60 whereby the latter is removable in a known fashion. A drain means 63 is also provided on the bottom of pan 60 to limit the level of liquid therein in accordance with level L—L as indicated in FIG. 3. This liquid level importantly effects a liquid seal across the open trough portion 45 of the broiler chamber to prevent uncontrolled entry of air thereinto. If desired, an automatic overflow system may be coupled to drain means 63 of the drip pan to remove accumulated liquid, but such a system is not essential. To assist in removing the drip pan 60, the forward end thereof is provided with a manually-engageable handle portion constituting a turned over lip flange, designated at 65 in FIGURE 2.

As mentioned previously, the open upper end of the broiling compartment 32 defined as above described, is suitably closed over during broiling operation by the pair of sliding closure members or doors 31 and 31'. It will be understood that food is loaded into and removed from the broiling compartment 32 via the opening 20 in the upper wall 17 of the cabinet, with access into and out of such compartment being controlled by appropriate positioning of the door members 31, 31'.

As best seen in FIGURES 2–5, the doors 31, 31' each constitute a substantially rectangular panel of stainless steel or like material capable of withstanding the intense heat of the broiling chamber. Each of the doors 31 and 31' carries at its opposite ends pairs of spaced rollers 70, 70 which are adapted to ride along the upper surfaces of a pair of parallel spaced linear rail elements 71, 72, located immediately adjacent and alongside the upper ends of the broiler chamber front and rear walls 36 and 37, respectively. The linear rails 71 and 72 are suitably affixed at their opposite ends to the supporting framework and end panels 13, 13 of the protective cabinet structure and, more specifically, are immediately supported on elongated angle iron members 73, 73 which extend lengthwise interiorly of the broiler housing (see FIGURE 2). Thus, the two doors 31 and 31' are adapted to move longitudinally back and forth along the two parallel spaced rails 71 and 72 and in opposite directions.

In order to actuate the doors as above indicated, a pair of endless actuator chains 75 and 76 are provided adjacent the opposite ends of the two doors and respectively adjacent the rails 71 and 72. As best shown in FIGURES 4 and 5, idler sprockets 77 and 78 are mounted adjacent the opposite ends of each of the rails 71 and 72, while a third or intermediate idler sprocket 79 is supported on a hanger bracket 80 substantially opposite and slightly below the mid-point of each of the rails 71 and 72. The rotational axes of the two end idler sprockets 77 and 78 are in a common horizontal plane offset above the rotational axis for the intermediate sprocket 79 so as to provide parallel upper and lower runs 81 and 82, respectively, for each of the drive chains 75 and 76. In this regard, each of the upper chain runs 81 extends substantially along the length of its respectively adjacent rail 71 or 72, as the case may be, while the lower runs 82 thereof extend substantially from one end of each of the rails to substantially the mid-point thereof.

The two endless actuator chains 75 and 76 are simultaneously actuated by means of a pair of large drive sprockets or wheels 85, 85 mounted on a common drive shaft 86. As will best be understood from FIGURES 2 and 3, the shaft 86 extends lengthwise through the broiler compartment 32 slightly to one side of a vertical plane passing through the longitudinal axis of that compartment; shaft 86 being rotatably supported by the front and rear walls 36 and 37 of the broiler compartment with drive sprockets 85, 85 located outwardly of such walls.

As previously mentioned, a manually operable control lever or handle 30 is available at the front control panel 14 of the cabinet for controlling operation of the doors 31, 31'; that handle being affixed to one end of the shaft 86, as best shown in FIGURE 2. Thus, rotational manipulation of handle 30 serves to rotatably drive shaft 86 to effectuate actuation of the two chains 75 and 76 and, more particularly, causing the upper and lower runs 81 and 82 thereof to move in opposite linear directions. In order to actuate the doors 31, 31' in response to such actuation of the chains 75 and 76, each of said doors is connected to one of the chain runs 81 and 82. More specifically, door 31 is joined at its opposite ends to the upper chain runs 81 of the two chains 75 and 76 by means of connector brackets 90, 90 which are fastened to elongated connector links 91 in the two drive chains. In a similar manner, door 31' is connected to the lower runs 82 of the two chains 75 and 76 by means of interjoined connector brackets 93 and elongated connector links 94, respectively, fastened to the ends of the door 31' and chain runs 82, 82.

It will be understood from the foregoing that rotation of the shaft means 86 in a clockwise sense will serve to actuate the door members 31, 31' from their FIGURE 4 to their FIGURE 5 positions. Conversely, rotation of shaft 86 in a counterclockwise sense, as by raising the operating handle 30, will serve to move the doors away from one another, thereby providing access to the interior of the broiling chamber through the top opening 20. In order to assist the operator in actuation of the doors 31, 31', as above described, and more particularly to assist such doors to their opening movement while providing a detent means for maintaining the same in their closed positions, a spring means 96 (see FIG. 2) is coupled at one end to a pin 97 projecting radially from shaft 86, behind the broiler compartment. The other end of spring 96 is attached to the framing of the cabinet. The arrangement of the spring means 96 is such that when the operating handle 30 is in its limit of clockwise movement as determined by the closing engagement of the two doors 31, 31', the spring is extended over shaft 86 with the pin means 97 past a dead center condition so that the spring acts as a detent means for maintaining the doors 31, 31' closed. Conversely, the spring assists in moving the operating handle 30 counterclockwise (see FIG. 1) for opening the two doors 31, 31'.

In order to coordinate the opening and closing movements of the door means 31, 31' with the desired positioning of the food supporting means 33 within the broiling chamber, means 33 is mechanically linked to the operating shaft 86 as will now be described. Referring particularly to FIGURES 3 and 4 of the drawings, it will be understood that the food supporting means 33 comprises a removable rack 100 made up of a plurality of interjoined cylindrical rods, according to known practice. The rack is supported on a rectangular frame comprising parallel spaced end rails 101 and 102 each constituting a metal member of L-shaped cross-section which are interjoined by rod members 103, 104 to constitute a fabricated rectangular frame structure receptive of the rack member 100. Each of the end rails 101 and 102 is fixed to the upper end of a centrally disposed and dependingly arranged plate 105 which is joined by a pivotal crank system comprising links 106 and 107 to the operating shaft 86; it being understood that one end of each link 107 is affixed to shaft 86 so that a reciprocating motion is imparted to the plate 105 and rack support 100 in response to rotation of shaft 86. The rack carriage or supporting frame is guided for vertical reciprocating movement by means of a parallel linkage or pantograph system composed of two pairs of parallel spaced link arm members 108 and 109, located at opposite ends of the rack supporting framework and joined to plate 105 by pivot means 110 and 111, respectively. The opposite or outer ends of each of the links 108 and 109 are connected to horizontal pivot rods 112 and 113, respectively, which extend lengthwise through the broiling chamber 32 and are supported at their ends by end walls 36 and 37.

With the above-described parallel linkage supporting system for the food supporting means 33, it will be readily understood that arcuate or rotational movement of the operating shaft 86 produces up and down or vertical displacement of the food supporting means within the broiling chamber 32. More specifically, when the operating arm 30 is moved clockwise to the position therefor illustrated in FIGURE 1, the accompanying clockwise rotation of operating shaft serves to lower the food supporting means into the central interior of the broiling chamber and between the several burners 50, 50' substantially as shown in FIGURES 3 and 5 of the drawings. Conversely, movement of the operating handle 30 counterclockwise to the limits imposed by the opening movements of the doors 31, 31', serves to simultaneously raise the food supporting means 33 to its upper position, as illustrated in FIGURE 4 of the drawings. It will be noted in particular that in its raised or upper position, the food supporting means 33 remains within the broiling chamber and is disposed substantially opposite the vent ducts 54 and 55 between the upper side walls 38, 38 of the broiling compartment. It is also important to recognize that the parallel linkage support means for the rack 100 serves to maintain the same in a horizontal position throughout its elevating and lowering movements.

With particular reference to FIGURE 3 of the drawings, it will be noted that when the food supporting means 33 is lowered into the broiling compartment for purposes of broiling food mounted thereon, the plane of the rack means 100 lies in a horizontal plane located substantially mid-way between the upper and lower burners 50 and 50', respectively. This zone limit is determined by engagement of the supporting structure for the rack and especially the rail members 101 and 102 thereof with the horizontal operating shaft 86 within the broiler compartment. In this position, food on the rack 100 receives substantially uniform radiant energy from each of the diagonally opposed burners. This feature permits a uniform searing of meat, for example, on both the top and bottom surfaces, as well as the peripheral edges. It further will be appreciated that with the simultaneous application of heat to the food from substantially all directions, the internal juices thereof are driven into a midzone of the food extending substantially horizontally thereacross. As a consequence, there is noticeably less tendency for the food to lose its internal juices than has heretofore been experienced with vertically supported food products as in the aforementioned Patent No. 2,997,941.

Energization of the four infrared gas burners is accomplished by means well known and recognized in the art and such, therefore, will not be described in detail herein. Basically, however, the preferred operating control of the burners includes means for electrically igniting the gaseous fuel and for automatically energizing the same with a "high fire" intensity at the initial stages of the broiling process to effectively sear the food and thereby retain the internal juices, followed by a "low fire" or low heat period to complete the cooking cycle. The duration of the high fire period is determined by setting the high fire timer dial 27 at the front control panel 14 which, since it is manually controlled, is capable of variation by the operator. In a similar manner, the low heat period is determined by setting the second timer dial 28 on the front control panel. Normally, during the high heat period the indicator lamp 29 is energized to provide a visible signal to the operator. At the end of the high heat period, the gas supply to the several burners is automatically reduced to produce the low heat stage or heating cycle which continues in accordance with the setting of the timer dial 28. If desired, an audible warning buzzer may be utilized, according to known practice, to indicate the termination of the low heat period, thus signalling the operator that the cooking cycle is completed. As set out in said U.S. Patent 2,997,941, according to conventional and recognized practice in this art, at the end of the cooking cycle the low heat stage preferably persists, or, that is, the burners 50, 50' remain energized while the access doors to the broiler compartment are opened and the cooked product removed by the operator. This keeps the broiling compartment heated for the next cooking cycle. For particulars of the gas supply means and various controls for carrying out the above-described high and low heating cycles, reference may be had to the aforementioned U.S. Patent 2,997,941.

Having thus described the various elemental portions and functional arrangements of the present invention, it will be understood by those familiar with the art that the various advantages and objects previously outlined are fully achieved by the apparatus hereinabove described. Of particular importance is the operational result achieved by the present apparatus in uniformly heating the food substantially from all sides simultaneously, while maintaining the same in a substantially horizontal condition. This arrangement substantially prevents the loss of the internal juices and liquids, as previously discussed, and therefore affords a heretofore unexperienced advantage in broiling devices of this class. Due to the radiant heating energy employed, the cooking cycle is fairly rapid and therefore a device of this type readily lends itself to commercial utilization for restaurants and the like. Because the food supporting means of this invention constitutes substantially an open grill, there is literally no restriction on the thickness of food that may be cooked thereon, which is particularly important in cooking meat, for example. Thus, the present device readily lends itself to cooking thick and large steaks or other meat products, restricted, of course, by the dimensional limits of the food supporting rack and the access opening into the broiling compartment. One of the more unique advantages provided by the present invention is the capability of the operator to readily view the product within the broiling compartment at any time during the cooking cycle by merely opening the closure doors 31, 31' and automatically raising the food supporting means 33 into the upper regions of the broiling compartment. Thus, if desired, the operator or chef may turn the meat or other food product over in accordance with more conventional cooking practices and thereafter return the food into the cooking zone located between the several burners. It is also to be noted that in infrared broiling devices of the class herein described, it is quite necessary to control the internal atmosphere of the broiling compartment in such a manner as to avoid excess oxygen and thereby prevent burning or combustion of the food. In essence, all oxygen or air input is controlled via the primary air or intake for the burners themselves, with the broiling compartment being otherwise substantially sealed from other air sources. This functioning is enhanced substantially by the provision of the closure doors 31, 31' which present only a single seal or opening therebetween as opposed to prior known arrangements in this art.

From the foregoing description it is believed that those familar with the art will readily recognize and understand the novel features and advantages of the present invention which mark the same as a departure and advancement over the prior art. Further, while the present invention has been hereinabove described in association with a preferred embodiment, as illustrated in the accompanying drawings, nevertheless it is to be understood that numerous changes, modifications and substitutions of equivalents may be readily made in such specifically described apparatus without departure from the spirit and scope of this invention. As a consequence, it is intended that the present invention be unlimited by the foregoing description, except as may appear in the following appended claims.

I claim:

1. Apparatus for broiling food comprising a chamber defining an internal controlled atmosphere broiling compartment having an open upper end through which the food may be introduced into said compartment, food supporting means mounted within said chamber, including rack means adapted to under-support said food in a substantially horizontal attitude, pantograph linkage means mounted in said compartment and operatively connected to said food supporting means and adapted to maintain said rack means substantially horizontal throughout movement of said supporting means vertically within said compartment, closure means mounted adjacent the open upper end of said chamber and adapted to be moved selectively to close over and open the same, means for actuating said linkage means to move said food supporting means vertically between upper and lower limits within said chamber, means interlinking said actuating means and said closure means for operatively moving the latter to close the open end of said chamber in response to movement of said food supporting means to its said lower limit and for conversely opening the upper end of said chamber in response to movement of said food supporting means to its said upper limit, spring means associated with said actuating means for effectively assisting the opening movement of said closure means and positionable by said actuating means for resiliently holding said closure means closed over the open end of said chamber, and gas fired infra-red heat-producing means mounted on opposite sides of said chamber and arranged above and below a horizontal plane coincident with said food supporting means when the latter is in its said lower limit whereby food on said rack means has its top, bottom and side surfaces subjected substantially directly to infra-red rays from said heat-producing means.

2. Apparatus for broiling food comprising a chamber defining an internal controlled atmosphere broiling compartment having an open upper end through which food may be introduced into said compartment, food supporting means mounted within said chamber, including rack means adapted to under-support said food in a substantially horizontal attitude, pantograph linkage means mounted in said compartment and operatively connected to said support means and adapted to maintain said rack means substantially horizontal throughout movement of said supporting means vertically within said compartment, closure means comprising a pair of co-planar, oppositely movable doors slidably mounted adjacent the open upper end of said chamber and adapted to be moved selectively to close over and open the same, said doors abuttingly engaging to seal over the open end of said chamber when enclosing the latter; means for actuating said linkage means to move said food supporting means vertically between upper and lower limits within said chamber, means interlinking said actuating means and said closure means for operatively moving the latter to close the open end of said chamber in response to movement of said food supporting means to its said lower limit and for conversely opening the upper end of said chamber in response to movement of said food supporting means to its said upper limit, and gas-fired infra-red heat producing means mounted on opposite sides of said chamber and arranged above and below a horizontal plane coincident with said food supporting means when the latter is in its said lower limit whereby food on said rack means has its top, bottom and side surfaces subjected substantially directly to infra-red rays from said heat-producing means.

References Cited by the Examiner
UNITED STATES PATENTS

| | | | |
|---|---|---|---|
| 2,244,168 | 6/1941 | Miller | 126—41 X |
| 2,848,592 | 8/1958 | Mergen | 126—41 X |
| 2,885,952 | 5/1959 | Campbell | 126—273 X |
| 2,997,941 | 8/1961 | Phelan et al. | 126—41 X |
| 3,193,663 | 7/1965 | Budzich et al. | 99—391 X |

FREDERICK L. MATTESON, JR., *Primary Examiner.*

JAMES W. WESTHAVER, *Examiner.*

E. G. FAVORS, *Assistant Examiner.*